J. E. HEIMERL.
GUARD AND RUNNER FOR GARDEN IMPLEMENTS.
APPLICATION FILED JULY 17, 1915.
1,174,317.
Patented Mar. 7, 1916.
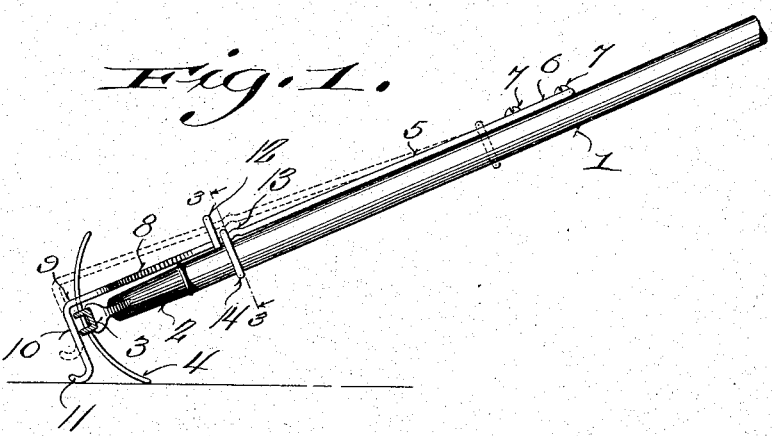
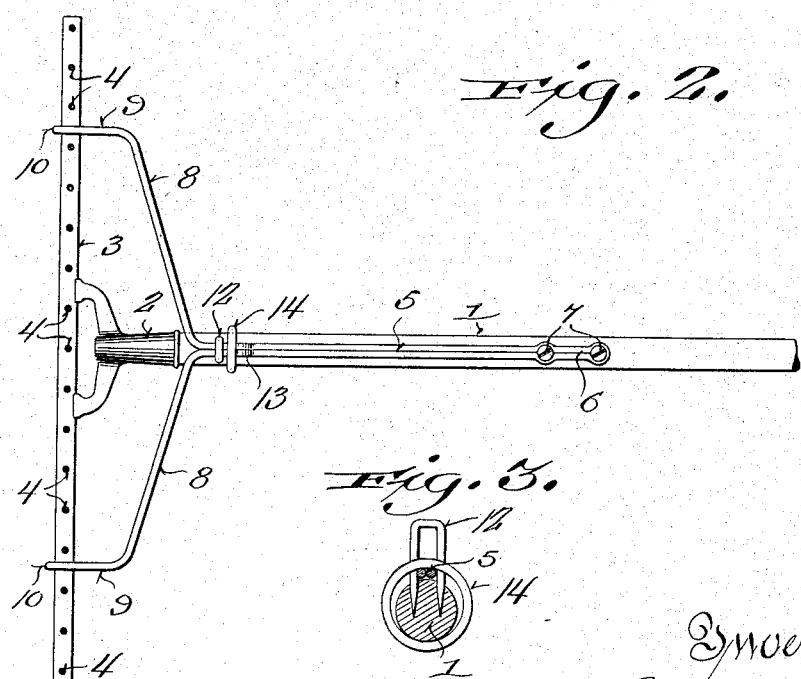

UNITED STATES PATENT OFFICE.

JULIUS E. HEIMERL, OF MILWAUKEE, WISCONSIN.

GUARD AND RUNNER FOR GARDEN IMPLEMENTS.

1,174,317. Specification of Letters Patent. Patented Mar. 7, 1916.

Application filed July 17, 1915. Serial No. 40,399.

*To all whom it may concern:*

Be it known that I, JULIUS E. HEIMERL, a citizen of the United States, and resident of Milwaukee, in the county of Milwaukee and State of Wisconsin, have invented certain new and useful Improvements in Guards and Runners for Garden Implements; and I do hereby declare that the following is a full, clear, and exact description thereof.

This invention relates to the subject of rakes, and has specially in view improvements in runners or shoes for rakes that will facilitate handling the same as well as to serve as guards to prevent the teeth penetrating the lawn or other place being raked, and also to facilitate the lifting of the raked material to deposit the same in a suitable receptacle.

The invention contemplates the production of a combined runner and guard that may be readily attached to any garden type of rake without altering the rake or impairing its efficiency, the guard being of such a material that the same automatically adjusts itself to accord with the surface being raked, means being provided whereby the range of automatic adjustment of the guard may be restricted, such means being disposed on the handle of the rake so as to be within easy reach of the user of the rake.

One simple and practical embodiment of the invention is shown in the accompanying drawings wherein—

Figure 1, is a view in side elevation of a rake equipped with the improved combined runner and guard. Fig. 2, is a top plan view of the same. Fig. 3, is a transverse sectional view taken on the line 3—3, Fig. 1.

The improved combined runner has been shown in the accompanying drawing applied to a rake that is of a well-known form, the rake consisting of a handle engaging the socket 2 of the head 3, the head being equipped with teeth 4. The rake shown is a reversible one, that is, one in which the teeth 4 project above and below the head 3.

The combined runner and guard is formed of resilient material shaped to form an elongated shank 5, having its free end portion 6 shaped for the reception of one or more fasteners 7, by means of which said end portion 6 is rigidly but removably fastened to the handle of the rake. At its other end, arms 8 diverge from the shank 5 and terminate in forward extensions 9, projecting transversely across the top of head 3, adjacent the ends of said head, the outer portions of said extensions projecting beyond the head and terminating in downwardly extending legs 10, the free ends of which are outwardly and downwardly curved to form the runners 11. Adjacent the junction of shank 1 and arms 8, the shank 1 is straddled by an upstanding guide loop 12 that is carried by the rake handle 1. And adjacent the guide loop 12 the shank 5 is crimped or otherwise treated to produce one or more outstanding abutments 13. The abutment 13 is preferably located to the rear of guide loop 12, and normally confines the adjusting ring 14 that encircles the handle 1 and shank 5, between the guide loop and abutment.

It is preferred to make the shank 5, arms 8, extensions 9, legs 10, and runners 11 of a single length of rod, wire, or other resilient material that can be readily shaped, and in using such material, the same is doubled on itself to produce the shank 5, the end 6 of which is in the form of a loop that is shaped for the reception of the fastener or fasteners 7. The arms 8 are produced by diverging the free end portions, then bending the outer portions of said arms so that they extend forwardly, and the outer portions of said extensions are bent abruptly downward to produce the legs 10, and the free ends of the legs are curved outwardly to produce the runners 11. The guide loop 12 may be a well-known form of staple, and such prevents lateral movements of the shank 5, yet permits a limited vertical movement of said shank relative to the handle 1.

The combined guard and runner being resilient, the tendency of the same is to spring outward relative to the handle 1 and head 3 when in use; but such movement is regulated by adjusting the ring 14 longitudinally of the shank 5, and handle 1. Normally the abutment 13 prevents rearward movement of the ring 14, but by firmly depressing the free portion of the shank 5, said portion will lie flat on the handle 1, whereupon the ring 14 may be freely slipped over the abutment and thereby permit an increase in the range of movement of the free portion of the shank 5 relative to the handle 1.

It will be understood from the foregoing, that the runners 11 facilitate the use of the rake in both the pulling movements of the rake and also by yieldingly opposing downward movement of the rake that would cause the teeth 4 to penetrate too deeply into the surface being raked.

While in the foregoing special stress has been laid on the utility of this invention in connection with lawn rakes it will be apparent that the invention is not at all restricted to such use, for the same could be readily used in connection with raking machines as well as with hoes and other agricultural implements and machines.

It will also be observed that the location of the arms 8 is such that they coöperate with the rake and the hand of the user to facilitate lifting the raked material and depositing such material in a receptacle.

I claim:

1. In combination with a rake, a combined runner and guard therefor formed of resilient material and comprising a shank, means for fastening the free end of the shank to the handle of the rake, arms diverging from the other end of the shank and projecting over and beyond the rake head and having downwardly projecting legs terminating in runners, means carried by the rake handle for preventing lateral movements of the shank, and means carried by the rake handle for regulating the resiliency of the shank.

2. In combination with a rake, a combined runner and guard formed of resilient material and comprising an elongated shank having at one end a projecting portion that extends over and beyond the rake head, and terminates in runners, means for fastening the other end of the shank to the handle of the rake, means carried by the rake handle for preventing lateral movements of the shank, and means slidable on the rake handle and shank for regulating the resiliency of the shank.

3. In combination with a rake, a combined runner and guard therefor formed of resilient material and comprising a shank, supporting portions projecting from one end of the shank over the rake head and being provided with runners, means for fastening the other end of the shank to the handle of the rake, an upstanding guide loop carried by the rake handle and straddling the shank, and an adjusting ring slidable on the rake handle and the shank.

In testimony that I claim the foregoing I have hereunto set my hand at Milwaukee, in the county of Milwaukee, and State of Wisconsin, in the presence of two witnesses.

JULIUS E. HEIMERL.

Witnesses:
H. JOSEPH DOYLE,
M. E. DOWNEY.

Copies of this patent may be obtained for five cents each, by addressing the "Commissioner of Patents, Washington, D. C."